US006058092A

United States Patent [19]
Masters et al.

[11] Patent Number: 6,058,092
[45] Date of Patent: May 2, 2000

[54] OPTICAL TAPE DRIVE THAT INCLUDES REDUNDANT OPTICAL HEADS TO PERFORM FAILURE RECOVERY

[75] Inventors: John R. Masters, Montgomery County; Keith Pollock, Harris County; A. Rene Martinez, Harris County; James R. Luttrall, Harris County, all of Tex.

[73] Assignee: Compaq Computer Corporation, Houston, Tex.

[21] Appl. No.: 08/941,467

[22] Filed: Sep. 30, 1997

[51] Int. Cl.[7] .................................................... G11B 7/00
[52] U.S. Cl. ................................. 369/97; 369/53
[58] Field of Search ................................... 369/44.37, 32, 369/44.12, 44.14, 97, 124, 83, 58, 54, 53; 360/53, 61, 64, 38.1, 130.21, 134

[56] References Cited

U.S. PATENT DOCUMENTS

| | | | |
|---|---|---|---|
| 3,824,623 | 7/1974 | Gucker | 360/124 |
| 4,661,941 | 4/1987 | Bell et al. | 369/97 |
| 4,807,213 | 2/1989 | Chung et al. | 369/97 |
| 4,908,815 | 3/1990 | Gregg et al. | 369/116 |
| 5,120,136 | 6/1992 | Oakley | 369/44.18 |
| 5,239,528 | 8/1993 | Narahara et al. | 369/97 |
| 5,253,128 | 10/1993 | Ike et al. | 360/63 |
| 5,379,162 | 1/1995 | Cunningham et al. | 360/53 |
| 5,617,380 | 4/1997 | Holstrom | 369/275.1 |

FOREIGN PATENT DOCUMENTS

| | | | |
|---|---|---|---|
| 58-6665 | 1/1983 | Japan | 369/97 |
| 62-24465 | 2/1987 | Japan | 369/97 |
| 2-81224 | 3/1990 | Japan | 369/97 |
| 2-90254 | 3/1990 | Japan | 369/97 |

*Primary Examiner*—Nabil Hindi
*Attorney, Agent, or Firm*—Akin, Gump, Strauss, Hauer & Feld, L.L.P.

[57] ABSTRACT

An optical tape drive including redundant optical heads to continue reading and writing data to an optical tape in the event of failure of one or more optical heads. The optical tape drive includes a plurality of optical heads, each capable of reading data from and writing data to an optical tape, detection logic that detects failure of any of the optical heads and control apparatus. The control apparatus positions each of the optical heads along the width of the optical tape, controls each of the optical heads to either read or write data, receives and moves the optical tape, detects failure of any of the optical heads and performs failure recovery by continuing to read and write data with remaining optical heads. The data throughput rate during failure recovery may be the same as the normal rate for some operations, such as direct read after write. Several different optical head configurations are contemplated. In respective embodiments, the optical tape drive includes two head systems, four head systems, eight head systems, etc., where each head system includes one or more optical head units.

24 Claims, 6 Drawing Sheets

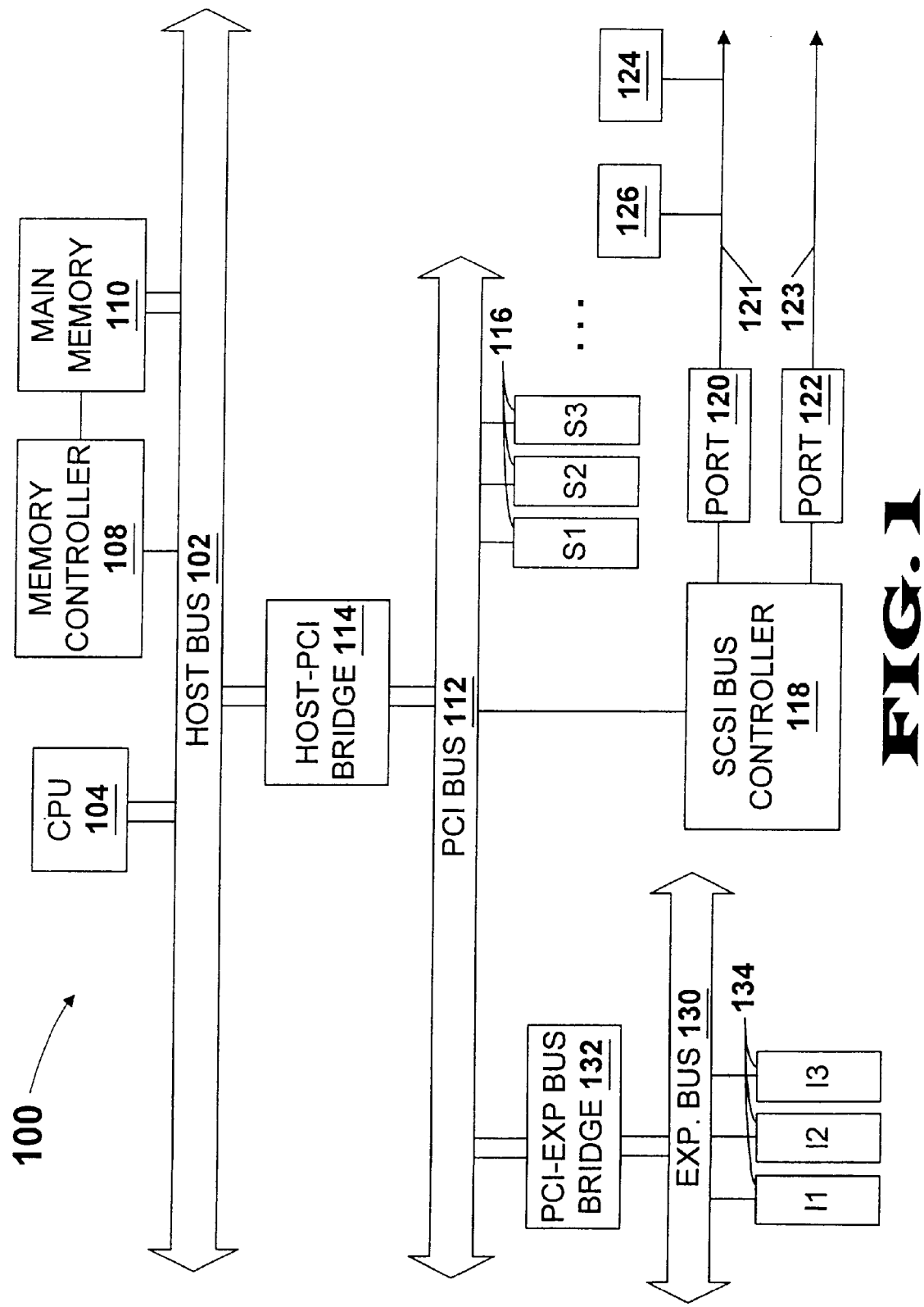

OPTICAL TAPE DRIVE THAT INCLUDES REDUNDANT OPTICAL HEADS TO PERFORM FAILURE RECOVERY

FIELD OF THE INVENTION

The present invention relates to volumetric data storage devices, and more particularly to an optical tape drive that includes redundant optical heads to perform failure recovery.

DESCRIPTION OF THE RELATED ART

Personal computer systems are continuing to develop at a relatively high pace due to substantial improvements in performance and density of semiconductor technology. The continual increase of computer system performance and use has lead to a corresponding need for improvements in the performance, capacity and reliability of auxiliary or secondary storage systems. Magnetic disk drives have provided a relatively convenient method of fast storage and retrieval of data and are usually the apparatus and method of choice for storing programs and data on a daily basis. Magnetic disks, however, even configured as redundant array of inexpensive drives (RAID), are not capable of handling all storage needs. Magnetic tape traditionally offered greater storage capacity and was one of the cheapest forms of storage for large quantities of data. However, magnetic tape suffers from relatively long access times because of sequential access, and thus has typically been used for archival and backup purposes.

There has been a recent explosion in mainframe and network computer sales, which has lead to an associated need for greater storage capacity. There is an increasing need for inexpensive high volume storage capacity systems that provide fast access, high density, high reliability and high bandwidth. Magnetic tape systems are simply not able to meet many of these increasing demands. Although the capacity of magnetic tape is high compared to other magnetic media, increasing storage needs have begun to stretch and exceed the practical limits of magnetic tape. The number of tracks or storage paths available on magnetic tape is limited by tape and track width, so that a relatively long magnetic tape within a cartridge or cassette is required to meet storage needs. Longer tape, however, increases the data access latency. For example, it may take several seconds to several minutes to retrieve a block of data from a magnetic tape. The heads of magnetic drive systems contact the magnetic tape media, causing tape and head wear during use. Also, the tape media tends to stretch with usage.

It is usually necessary to read data from the tape after being written for purposes of verification. Due to practical limitations of magnetic systems, each head is typically dedicated to either read or write functions and is not designed for both. Some magnetic tape systems provide direct read after write (DRAW) by including both a write head and a read head. For bi-directional DRAW capabilities, two read heads have been placed on either side of a write head to enable reading of data just written in either direction. A three head per track configuration is relatively expensive and tends to reduce the total number of heads available in a drive unit.

In summary, magnetic tape systems have relatively slow access and insufficient density, reliability and bandwidth to meet increasing storage capacity demands. It is desirable to provide a storage system that is capable of meeting these needs in a practical and cost effective manner. Furthermore, a magnetic tape system is usually rendered inoperable in the event of failure of its magnetic head. It is desired to continue operations in the event of such failure even if at reduced data throughput.

SUMMARY OF THE INVENTION

An optical tape drive according to the present invention includes redundant optical heads to continue reading and writing data to an optical tape in the event of failure of one or more optical heads. The optical tape drive includes a plurality of optical heads, each capable of reading data from and writing data to an optical tape, detection logic that detects failure of any of the optical heads and control apparatus. The control apparatus positions each of the optical heads along the width of the optical tape, controls each of the optical heads to either read or write data, receives and moves the optical tape, detects failure of any of the optical heads and performs failure recovery by continuing to read and write data with remaining optical heads.

The level of failure recovery depends upon the type of operation and how the optical tape drive is configured to function during normal operation. In one mode of operation for performing direct read after write (DRAW) operations, the optical tape drive aligns each pair of optical heads on a separate track to achieve a predetermined data throughput rate during normal operations. In the event of failure of an optical head, the control apparatus uses half the optical heads and writes data in a first pass of the optical tape on the same number of tracks as normal, rewinds the tape, and then uses same heads to read the data in a second pass for verification. This mode results in less than one-third normal data throughput rate for DRAW operations. Alternatively, DRAW operations are continued with less than the normal number of tracks. For example, an eight optical head unit that normally performs DRAW operations on four tracks at a time may continue DRAW operations with three tracks using six heads in the event of failure of one head, or with two tracks using four heads in the event of failure of three heads, etc. In this DRAW head configuration where DRAW operations use all of the heads, read and unverified write operations use only half of the optical heads. In the event of failure of an optical head, the control apparatus continues to perform read and unverified write operations at normal data throughput rate.

The present invention contemplates several different optical head configurations, where each configuration includes at least two independently positionable optical heads. Each optical head is mounted on a head system that is independently positionable relative to other head systems via central and distributed control logic. In one embodiment, the optical tape drive includes multiple independently positionable heads, such as two, four, eight, etc. optical heads. In another embodiment, one or more optical heads are mounted on one or more head systems. For example, the optical tape drive may include two head systems, where each head system includes an array of two, three, four, etc. optical heads. Of course, more head systems may be included, such as an eight head unit with four head systems where each head unit has two optical heads.

In one embodiment described herein, the control apparatus includes a plurality of head systems, each including at least one of the optical head units. Each head system is independently controllable by a central controller. Each head system may further include multiple head units arranged in an array, where each head unit is displaced from the other head units in the array relative to the optical tape. The displacement preferably corresponds to track spacing in order to read and write different tracks simultaneously. For example, each head in an array may be displaced by one track each. In respective embodiments, the optical tape drive includes two head systems, four head systems, eight head systems, etc., where each head system includes two head units, four head units, etc. Thus, an eight head tape drive may have four head systems, each with an array of two head units, or two head systems, each with an array of four head units. Many variations are possible depending upon particular design parameters and specification requirements.

An optical tape drive according to the present invention may include a plurality of head systems, each including at least one optical head, head control circuitry, course and fine tracking servo apparatus, a local servo controller, data processing circuitry and a channel controller that includes failure detection circuitry. The optical tape drive further includes a central servo controller and a central controller that controls tracking and data flow of each of the optical heads via the head systems. The central controller includes central failure detection circuitry.

An optical tape drive according to the present invention may store redundant information in the form of parity or mirrored information using multiple optical heads. Read or write operations may proceed in the event of failure of an optical head since the remaining tracks of the optical tape are used to store redundant information. Write operations may proceed even though redundancy is lost, since data from a lost track is retrievable with one or more of the remaining tracks. Read operations may proceed, where lost data due to a failed head unit is regenerated using corresponding data from corresponding tracks on the optical tape.

A computer system according to the present invention includes a processor, main memory, a peripheral bus and an optical tape drive coupled to the peripheral bus. The optical tape drive includes an optical tape receiving and driving mechanism that receives and manipulates an optical tape, a plurality of optical heads each capable of reading data from and writing data to the optical tape, detection logic that detects failure of any of the optical heads and control apparatus. The control apparatus positions each of the optical heads along the width of the optical tape, controls each of the plurality of optical heads to either read or write data, receives and moves the optical tape, and detects failure of any of the optical heads and continues read and write operations. The processor preferably executes a driver and software code loaded in the main memory to control operations of the optical tape drive. The driving mechanism may include a SCSI drive controller or the like, and the peripheral bus may be the peripheral component interconnect (PCI) bus or the like.

A method of providing and operating an optical tape drive to continue reading and writing data in the event of failure of an optical head according to the present invention includes providing a plurality of read/write optical heads including at least two independently positionable optical heads, detecting failure of any of the optical heads, and continuing to read and write data using remaining and functional optical heads in the event of failure of any of the optical heads. The method may further comprises selecting and using half of the optical heads in the event of failure of any one to up to half of the optical heads. For DRAW operations, the method may further comprise using half of the optical heads to write data on selected tracks in a first pass of the optical tape, rewinding the optical tape, and reading the data from the selected tracks in a second pass of the optical tape. Alternatively, for DRAW operations, the method may further include performing DRAW operations on a selected number of tracks of optical tape during normal operation prior to failure of any of the optical heads, and performing DRAW operations on less than the selected number of tracks of optical tape after failure of any of the optical heads.

An optical tape drive according to the present invention provides many advantages over other types of mass storage systems, such as magnetic tape drive systems. An optical head is capable of both reading and writing data, so that DRAW functions are easily performed with two heads per track. Optical systems enable greater storage capacity for a given size of tape, so that a greater amount of storage space is available. The length of tape for a given storage capacity is reduced, which results in a concomitant reduction in access time, so that data may be retrieved in a shorter amount of time. Also, optical heads do not need to physically contact the tape media, so that wear and tear of the optical media and heads is substantially reduced as compared to magnetic tape systems. Furthermore, the operations may be continued in spite of failure of any one or more of the optical heads because of head redundancy. Several operations may be performed at reduced data throughput. An optical tape drive according to the present invention provides all these advantages among others in a cost effective manner.

BRIEF DESCRIPTION OF THE DRAWING

A better understanding of the present invention can be obtained when the following detailed description of the preferred embodiment is considered in conjunction with the following drawings, in which:

FIG. 1 is a block diagram of a computer system used in conjunction with an optical tape drive implemented according to the present invention;

DETAILED DESCRIPTION OF THE PREFERRED EMBODIMENT

Figure 2A:
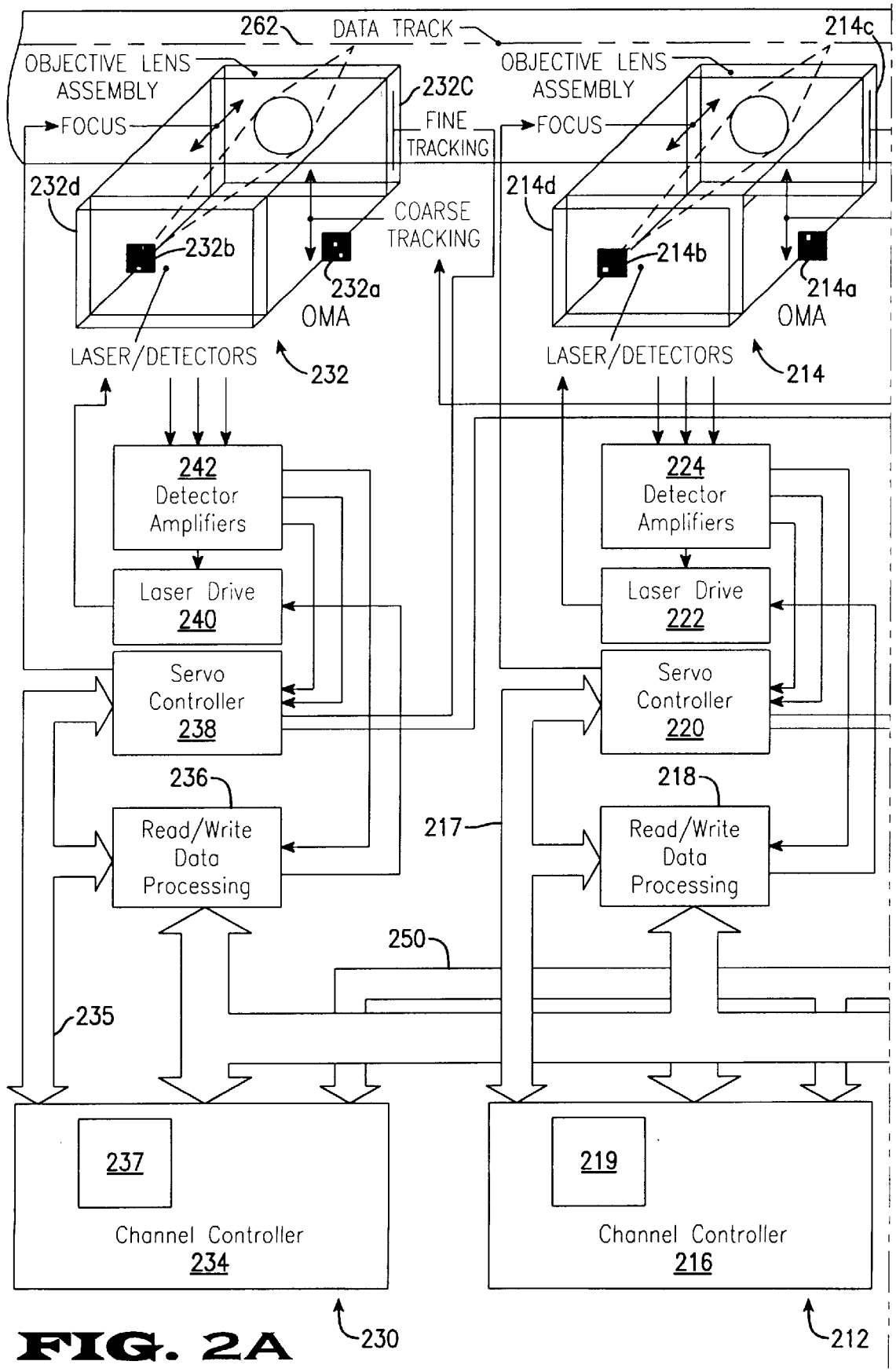
FIG. 2 is a block diagram of the primary components of the optical tape drive of FIG. 1.

Referring now to FIG. 1, a block diagram is shown of a computer system 100 that is used to illustrate an optical tape drive system implemented according to the present invention. The computer system 100 is preferably an IBM-compatible, personal computer (PC) system or the like. The computer system 100 includes a host bus 102 coupled to at least one central processing unit (CPU) 104. The CPU 104 preferably incorporates any one of several microprocessors and supporting external circuitry typically used in PCs, such as the 80386, 80486, Pentium™, Pentium II™, etc. microprocessors from Intel Corp., where the external circuitry preferably includes an external or level two (L2) or the like (not shown). Although the present invention is illustrated with an IBM-compatible type PC system, it is understood that the present invention is applicable to other types of computer systems and processors as known to those skilled in the art. The present invention is also applicable to any type of mass storage system requiring large volumetric capacity. For example, an optical tape drive according to the present invention may be used for purposes of backup or data archival for a PC or server system. Or the present invention may be used for storage of large databases, such as satellite images or medical records, and may be used with database intensive applications, such as computer aided drafting (CAD) systems, etc.

A memory controller 108 is coupled to the host bus 102 and the main memory 110 to receive and control main memory operations. The main memory 110 is coupled to the host bus 102 via buffers (not shown) for data transfer. The main memory 110 may be implemented with one or more memory boards (not shown) plugged into compatible memory slots on the motherboard, although any main memory configuration is contemplated. The computer system 100 includes a peripheral component interconnect (PCI) bus 112 coupled to the host bus 102 via a Host-PCI bridge 114, which handles translation of signals between the host bus 102 and the PCI bus 112. The PCI bus 112 is typically implemented with one or more PCI slots 116, individually labeled S1, S2, S3 and so on, where each of the PCI slots 116 are configured to receive compatible PCI adapter cards incorporating one or more PCI devices as known to those skilled in the art. Typical IPCI devices include network interface cards (NICs) disk controllers such as a SCSI (Small Computer System Interface) disk controller, video or graphics controllers, etc. A PCI compatible SCSI bus controller 118 is coupled to the PCI bus 112 for interfacing SCSI devices. The SCSI bus controller 118 may also be implemented as a PCI card that is plugged into any of the PCI slots 116. Alternatively, the SCSI bus controller 118 may be implemented within a separate storage box with a fiber channel interface, in which case a PCI to fiber interface is provided and plugged into one of the slots 116.

It is noted that the computer system 100 may be implemented in any one of many alternative manners. For example, an industry standard architecture (ISA) bus or an extended ISA (EISA) bus could be substituted for the PCI bus 112. For an EISA bus, the Host-PCI bridge 114 would be replaced by an EISA bus controller (EBC) for handling transitions of signals between the host bus 102 and an EISA bus. The PCI slots 116 are instead EISA slots for receiving EISA compatible cards, and the SCSI bus controller 118 is replaced by a corresponding SCSI controller device implemented for interfacing an EISA bus, which may or may not include a EISA bus master interface device. Alternatively, the computer system 100 includes an expansion bus 130 coupled to the primary PCI bus 112 through a PCI-Expansion bus bridge 132. The expansion bus 130 is any one of many different types, including another PCI bus, an ISA bus, an EISA bus or the microchannel architecture (MCA) bus, among others. For an EISA bus, the PCI-expansion bus bridge 132 is a PCI-EISA bridge. The expansion bus 130 preferably includes one or more expansion or input/output (I/O) slots 134, individually labeled I1, I2, I3, etc. A SCSI bus controller coupled directly to the expansion bus 130 or configured to plug into one of the slots 134 to interfacing the expansion bus 130 could be used instead of the SCSI bus controller 118.

Other components, devices and circuitry are normally included in the computer system 100 though not shown as not being particularly relevant to the present invention. Such other components, devices and circuitry are coupled to the host bus 102, the PCI bus 112, the expansion bus 130 or other input/output (I/O) buses (not shown) that may be included. For example, the computer system 100 may include an integrated system peripheral (ISP), an interrupt controller such as an advanced programmable interrupt controller (APIC) or the like, arbiter(s), a system ROM (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory etc.

The SCSI bus controller 118 is preferably implemented according to any of the SCSI standards and includes one or more SCSI ports for interfacing a corresponding one or more SCSI buses. The SCSI bus controller 118 shown includes two SCSI ports 120, 122 for interfacing SCSI buses 121, 123, respectively. The SCSI buses 121, 123 may be internal or external to the computer system 100 as desired. One or more SCSI devices are coupled to either the first SCSI bus 121 or the second SCSI bus 123. As shown, a SCSI compatible optical tape drive 124 according to the present invention is coupled to the SCSI bus 121. Also shown is a SCSI compatible hard disk drive 126 coupled to the SCSI bus 121. The SCSI bus controller 118, the optical tape drive 124 and the hard disk drive 126 may be implemented according to SCSI-1 (ANSI X3.131-1986), SCSI-2 (ANSI X3.131-1994) including Fast SCSI, Wide SCSI-2 and Fast Wide SCSI or SCSI-3, which includes a plurality or family of standards including Fast-20SCSI, Ultra Wide SCSI, DoubleSpeed SCSI, etc. The SCSI bus controller 118, the optical tape drive 124 and the hard disk drive 126 may alternatively be implemented according to any one of several disk drive implementations, such as the Integrated Drive Electronics (IDE), the AT Attachment (ATA) or ATA-2 or ATrA-3, the enhanced-IDE (FIDE), the ATA Packet Interface (ATAPI), etc.

Figure 2B:
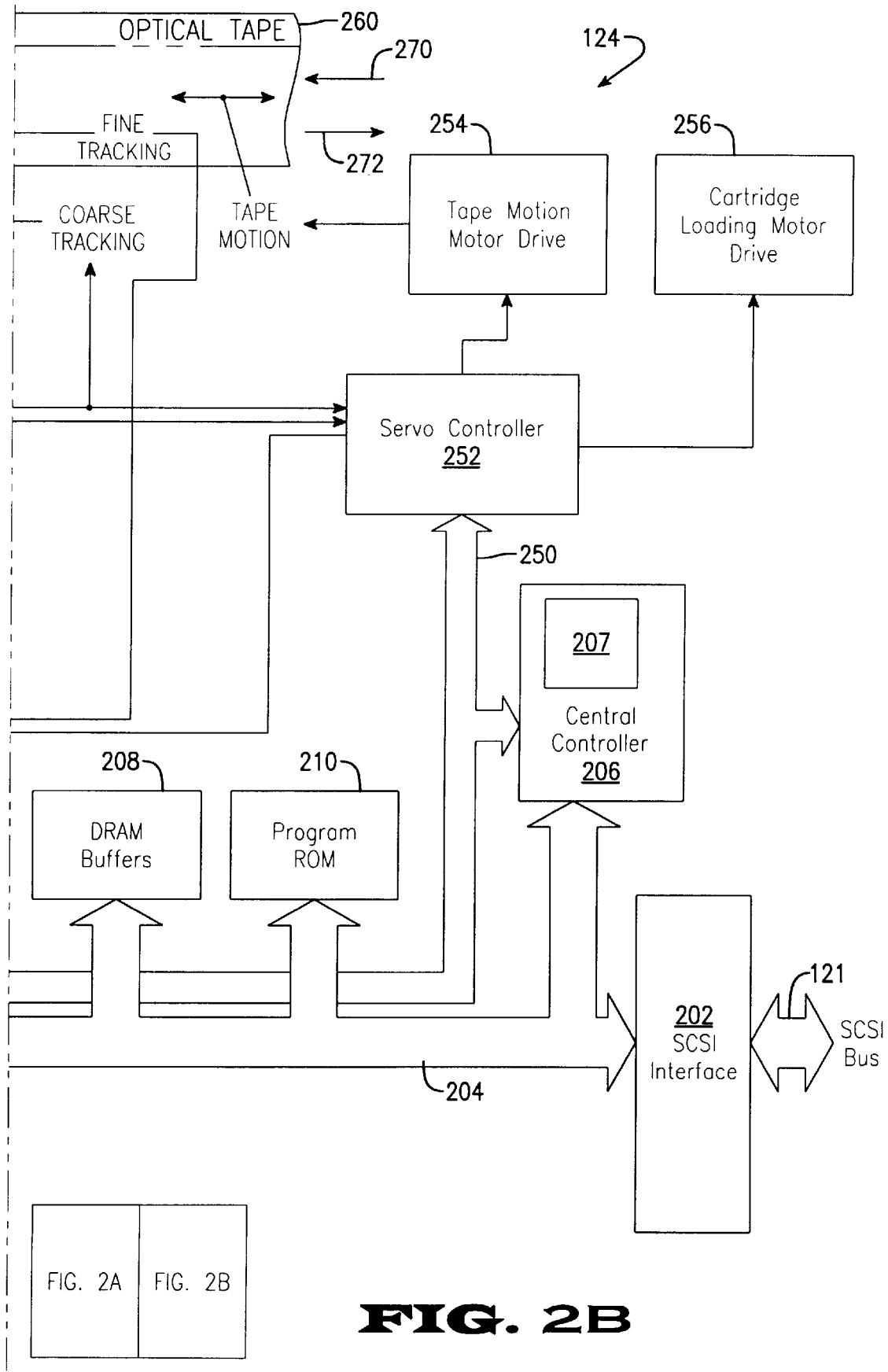

Referring now to FIG. 2, a block diagram is shown of the primary components of the optical tape drive 124. A SCSI interface 202 for transferring data, control parameters and control commands between the optical tape drive 124 and the computer system 100 is coupled to the SCSI bus 121 via an appropriate SCSI cable or the like (not shown). The SCSI interface 202 is also coupled to a primary data bus 204 within the optical tape drive 124, which is further coupled to a central controller 206 that controls the primary functions of the optical tape drive 124. The data bus 204 is also coupled to a buffer memory 208, to a programmable read only memory (ROM) 210, and to processing and control circuitry within each of one or more head systems. As shown in FIG. 2, two separate head systems 212 and 230 are shown, each including at least one optical mechanism assembly (OMA) or head unit 214 and 232, respectively. Each OMA 214 or 232 may be of any type, including those typically used with optical disk drive systems or the like.

As described more fully below, any number of head systems may be included within the optical tape drive 124 as desired. Each head system is operated independent of the other head system(s). Also, each head system may include multiple OMAs or head units forming an array of head units. As further described below, each head unit in a head array may be aligned with the same track of an optical tape, but is preferably aligned with different tracks, such as adjacent tracks, on optical tape media. FIG. 2, showing two independent head systems each with a single head unit, is an exemplary embodiment for purposes of illustration, where it is understood that many different types of head configurations are possible and contemplated.

The head systems 212 and 230 are implemented in a similar manner, where each includes a separate channel controller 216 and 234, respectively, each coupled to the data bus 204. Each head system 212, 230 includes read/write (R/W) data processing logic 218 and 234, respectively, each coupled to the central data bus 204. A primary control and communication bus 250 is coupled between the central controller 206, to each of the channel controllers 216 and 234, and to a central servo controller 252. Within the head system 212, a local or secondary control and communication bus 217 is coupled between the channel controller 216, the R/W data processing logic 218 and a local servo controller 220. The R/W data processing logic 218 provides data signal(s) to a laser drive unit 222, which controls the intensity of an optical laser beam of the OMA 214 for writing data. The R/W data processing logic 218 receives data signals from an array of detector amplifiers 224. The detector amplifiers 224 also provide control signals to the servo controller 220 for positioning purposes and to a laser drive unit 222 for controlling the intensity of the laser beam. The servo controller 220 provides control signals to the central servo controller 252 for tracking purposes.

Likewise, the head system 230 includes a local control and communication bus 235 coupled between the channel controller 234, the R/W data processing logic 236 and a local servo controller 238. The R/W data processing logic 236 provides data signal(s) to the laser drive unit 240, and receives data signals from an array of detector amplifiers 242. The detector amplifiers 242 provide control signals to the local servo controller 238, which provides control signals to the central servo controller 252 for tracking control purposes. The detector amplifiers 242 also provide control signals to the laser drive unit 240 for controlling the intensity of the laser beam.

The central servo controller 252 controls a tape motion motor drive unit 254, which is operatively coupled to move a strip of optical tape, such as an optical tape 260, in either one of two directions including forward and reverse. The optical tape 260 is provided with any type of drive mechanism, such as reel to reel, cassette, cartridge, etc. In one embodiment, for example, the optical tape 260 is provided within a cartridge that is loaded into the optical tape drive 124 by a cartridge loading motor drive 256 as controlled by the central servo controller 252. The central controller 206 sends commands via the control and communication bus 250 to the servo controller 252, which loads a tape cartridge and moves the optical tape 260 as directed.

The optical tape 260 is of any type, such as commercially available write once, read many (WORM) type. Non-oblative type optical tape with write many capability is also contemplated. An optical beam, such as a laser beam, striking a track on the optical tape 260 at a sufficient power to write data causes a change in particle alignment along the track. A data track 262 is shown along the optical tape 260 for illustration. For purposes of reading data, the laser beam is operated at reduced power for reading and is reflected off the data track 262 on the optical tape 260 to a detector within an OMA. The phase of the reflected laser beam identifies the data written on the data track 262. The optical tape 260 has any desired and practical length depending upon the amount of storage space required. A one inch wide optical tape includes approximately 10,000 tracks across its width, where each track is approximately 1 to 2 microns wide. A 100 meter, one inch wide tape with approximately 10,000 tracks stores approximately 200 giga-bytes (GB) of data. The optical tape 260 may be any suitable width and length as desired depending upon the amount of storage space necessary.

The OMA 214 includes a servo apparatus 214*a* which further includes several servos (not shown) for purposes of tracking and focus. The servo controller 252 controls a first servo for course tracking that is capable of moving the OMA 214 across the entire width between the opposite edges of the optical tape 260. The course tracking servo has a resolution of approximately 20 tracks or less to position the OMA 214 on or near a target track, such as a data track 262. The servo controller 220 controls a second servo for fine tracking that is capable of moving the OMA 214 approximately 20 tracks in either direction across the width of the optical tape 260 to position the OMA 214 over a target track, such as the data track 262. The OMA 214 includes a laser assembly 214*b* including a laser generator that generates and projects a laser beam towards the optical tape 260. The laser assembly 214*b* receives signals from the laser drive unit 222 for controlling the intensity of the laser beam to read or write data. The OMA 214 includes an objective lens assembly 214*c* that focuses the laser beam onto a target track on an optical tape, such as the track 262 of the optical tape 260. The local servo controller 220 controls a third servo within the OMA 214 that moves the objective lens assembly 214*c* to focus the laser beam on the target track 262.

The OMA 214 includes an array of laser detectors 214*d* that receive the reflected laser beam from the optical tape 260. The array of laser detectors 214*d* preferably includes a data detector for sensing data read from the optical tape 260, a centering detector for sensing the location of the laser on the data track 262, an end of tape detector for sensing the end of the optical tape 260, an edge detector for sensing either edge of the optical tape 260, and an output power detector for sensing the power of the laser beam generated by the laser assembly. The array of laser detectors 214*d* provide corresponding signals to each of the array of detector amplifiers 224, which amplifies the signals for processing. Amplified signals from the detector amplifiers 224 are provided to the servo controller 220, which controls the line tracking servo and the focus servo. The servo controller 220 also sends signals to the servo controller 252 to change the course position of the OMA 214 if necessary to move to a distant data track. Data read by the data detector from the optical tape 260 is amplified by the detector amplifiers 224 and provided to the R/W data processing logic 218. Write data is provided via signals from the R/W data processing logic 218 to the laser drive unit 222, which controls the laser beam to write the data onto the optical tape 260.

The OMA 232 is configured and operates in a similar manner as the OMA 214 and includes servo apparatus 2324*a*, a laser assembly 232*b*, an objective lens assembly 232*c* and an array of laser detectors 232*d*. The channel controller 234, the R/W data processing logic 236, the servo controller 238, the laser drive unit 240 and the array of detector amplifiers 242 of the head system 230 operate in a similar manner as the corresponding components within the head system 212 and will not be further described.

The ROM 210 stores parameters for use by the controllers 206, 216 and 234. The central controller 206 generally controls the primary operations of the optical tape drive 124 including tape movement and operation of the head systems 212 and 230. The channel controllers 216 and 234 receive commands from the central controller 206 to control fine tracking of the OMAs 214, 232 and to control reading data from, and writing of data to, the optical tape 260.

A driver and/or a software program are preferably executed by the computer system 100 for controlling operations of the optical tape drive 124. For example, the driver and program code are stored on any type of permanent media, such as a hard disk drive, a floppy disk, a CD-ROM, etc., loaded into the main memory 110 and executed by the CPU 104. The CPU 104 correspondingly controls the optical tape drive 124 to write data onto or retrieve data from the optical tape drive 124. In general, control commands and/or parameter are provided to the central controller 206 via the PCI bus 112, the SCSI bus controller 118, the SCSI bus 121 and the SCSI interface 202. The central controller 206 then performs the requested operation. The central controller 206 may operate as a bus controller for performing data transfer, or any other bus controller on the PCI bus 112 may operate as a bus master. Data stored in the main memory 110, on the hard disk drive 126 or on any other media and corresponding drive is transferred for storage onto an optical tape via the optical tape drive 124. Likewise, data stored on an optical tape is retrieved via the optical tape drive 124 and stored in the main memory 110 or any other chosen storage media., such as a floppy disk (not shown), the hard disk drive 126, etc.

As is clear from the above description, each head system 212, 230 performs both reading and writing operations and these functions may be swapped at any time as necessary or desired. An optical tape drive with two independent head systems allows two separate tracks on an optical tape to be read simultaneously. Also, two separate tracks may be written simultaneously, although the data would be unverified. Such simultaneous operation effectively doubles the throughput as compared to a single head. However, it is usually preferred to read data from a track that has just been written to verify that the data was written correctly. For purposes of direct read after write (DRAW) operations, the two head systems 212, 230 align the OMAs 214 and 232 over the same data track of the optical tape. For example, if both of the OMAs 214 and 232 are aligned with the data track 262 and the optical tape 260 is moved from right to left as shown by a direction arrow 270, then the OMA 214 is operated to write data while the OMA 232 is operated to read data for purposes of verification. Data may also be written and verified in the opposite direction by reversing the direction of the optical tape and by swapping the roles of the head units. Thus, if the optical tape 260 is moved in the opposite left-to-write direction as illustrated by an arrow 272, then the OMA 232 is operated to write data on the track 262 while the OMA 214 is operated to read the data just written. The optical tape drive 124, therefore, with two independent head units is capable of bidirectional DRAW operations on a single track of optical tape.

The use of two independently positionable head systems enables a limited amount of failure recovery. Since both heads have read and write capabilities, the optical tape drive 124 is not completely disabled in the event either of the OMAs 214 or 232 or even if either head system 212 or 230 fails. Thus, the optical tape drive 124 remains functional at a lower throughput or performance until maintenance is performed. The local channel controller 216 or 234 each includes failure detection logic 219 and 237, respectively, that report failure of their corresponding OMAs 214 or 232, respectively, to the central controller 206. The central controller 206 includes failure detection and response logic 207 that operates in conjunction with the failure detection logic 219 and 237 to detect failure of either head system 212 or 230. As described further below, in the event of any failure, the central controller 206 modifies operation to perform data operations without the failed head unit or system.

Read or unverified write operations may still proceed at full data throughput (for one track) or half data throughput (for two tracks) simply by using one head system. DRAW operations are still achieved at approximately one-third ($\frac{1}{3}$) throughput. In particular, the central controller 206 causes the remaining head system to write a whole track or any portion thereof, rewinds the optical tape 260, and then causes the operating head system to read the data just written for verification. Positioning and tracking add some extra time so that actual throughput may be somewhat less than $\frac{1}{3}$ normal operation with two functional head systems.

More head systems may be provided up to any practicable limit to increase the data throughput. Also, each head system, such as the head systems 212, 230, may include multiple head units forming a head array. The head units in each head array are in fixed positions relative to each other and thus are moved together by the course and fine tracking servos. The focus function may be performed by a single servo, or separate focus servos may be included for each head unit in a head array. A separate array of detector amplifiers 224 and separate or combined laser drive unit 222 are provided for each additional head unit in each head system. The servo controller 220 is the same for a single focus servo and is modified to control separate focus servos depending upon the particular design. Multiple R/W data processing logic is provided or the R/W data processing logic 218 is modified to handle multiple data paths for multiple head units. A head array may include two, three, four or more separate head units per head system, where each head unit is aligned to read and write a different track on the optical tape 260. Preferably, the head units are aligned to create, write and read adjacent tracks on an optical tape.

Figure 3A:
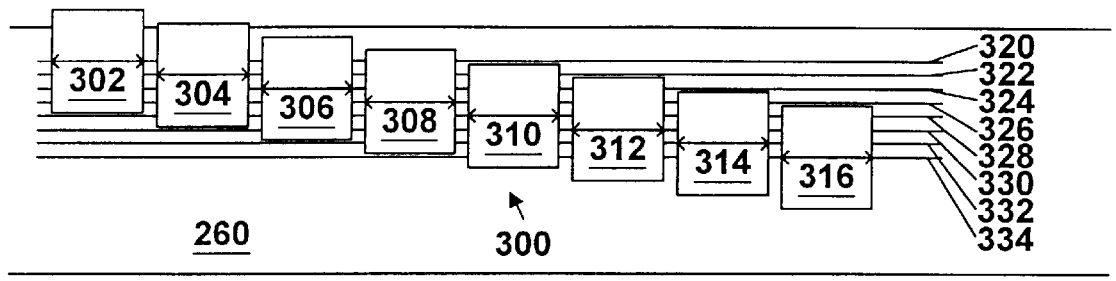
FIG. 3A is a perspective diagram illustrating an alternative head configuration according to the present invention with more than two independent head units.

Referring now to FIG. 3A, a simplified perspective diagram is shown of another head configuration 300 according to the present invention. The head configuration 300 includes eight independent head systems, each similar to the head systems 212 or 230 described above. Each head system includes a head unit for a total of eight head units 302, 304, 306, 308, 310, 312, 314 and 316, each similar to the OMAs 214 or 232 described above. Only the head units 302–316 of the head systems are shown for purposes of clarity. The head units 302–316 are shown aligned with eight adjacent tracks 320, 322, 324, 326, 328, 330, 332 and 334, respectively, of the optical tape 260. The spacing between the tracks 320–334 and the head units 302–316 is substantially enlarged in FIG. 3A for purposes of illustration, where actual spacing of 1–2 microns would otherwise be difficult to distinguish with the naked eye. Each head unit 302–316 is approximately ¼" to 1" on a side, so that in actuality the head units 302–316 would appear to be linearly aligned even if spaced by one track each. The head configuration 300 with eight independent head units 302–316 allows significant flexibility in the type of read or write operations to be performed. In FIG. 3A, for example, the eight head units 302–316 aligned with eight corresponding and adjacent tracks 320–334 allows simultaneous reading or writing of all eight of the tracks of the optical tape 260. However, such simultaneous track writing would be unverified.

Figure 3B:
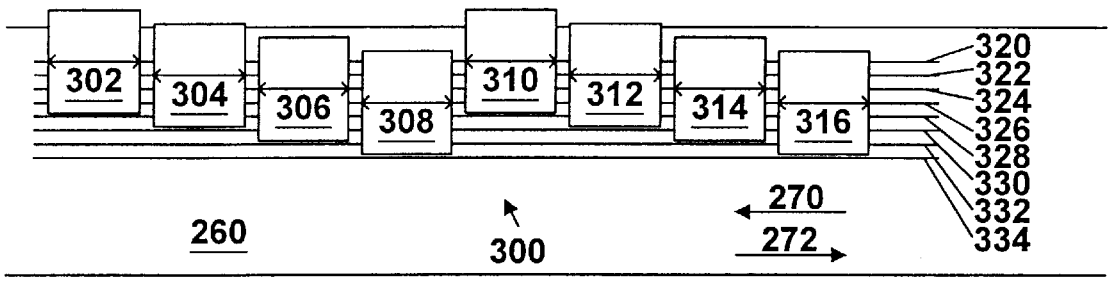
FIG. 3B is a perspective diagram of the head configuration of FIG. 3A positioned to perform direct read after write operations.
Figure 3C:
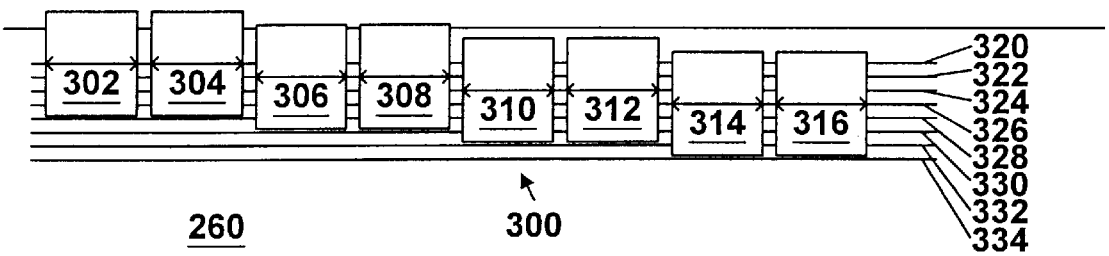
FIG. 3C is a perspective diagram of the head configuration of FIG. 3A with alternative head unit positions to perform direct read after write operations.

FIG. 3B shows the head configuration 300 aligned for purposes of DRAW operations at a substantially high throughput rate with a single pass of optical tape. As shown in FIG. 3B, the head units 302, 304, 306 and 308 are aligned with tracks 320, 322, 324 and 326, respectively. The head units 310, 312, 314 and 316 are also aligned with tracks 328, 330, 332 and 334, respectively. In this manner, two head units are aligned with each of the four tracks 320–326. Many other head unit alignments are possible for DRAW purposes. For example, FIG. 3C illustrates an alternative alignment for DRAW purposes, where the head units 302 and 304 are aligned with track 320, head units 306 and 308 are aligned with track 322, head units 310 and 312 are aligned with track 324, and head units 314 and 316 are aligned with track 326. For purposes of DRAW where two head units are aligned with the same track, one head unit is operated to write data and the other head unit is operated to read the data to verify that the data was written correctly. This enables data to be written and verified with a single pass of the optical tape 260. If the direction of the optical tape 260 is reversed, the read/write functions of the two heads are reversed to write data in the opposite direction in a single pass.

For example, when the optical tape 260 is moved from right to left as shown by the direction arrow 270, the head units 310–316 are operated to write data on the tracks 320–326, respectively, while the head units 302–308 are operated to read the written data on the tracks 320–326 at a finite time interval later. The amount of finite time depends upon the speed of the optical tape 260. Thus, for each of the four tracks 320–326, data is written by one head unit and then read for verification by another head unit. If the direction of the optical tape 260 is reversed as shown by the other direction arrow 272, then the head units 302–308 are operated to write data while the head units 310–316 are operated to read the written data. In this manner, one set of tracks has data written in one direction while another set of tracks has data written in the opposite direction. After data is written and verified by the head units 302–316 on the tracks 320–326 in the direction of the arrow 270, the head units 302–316 may be aligned for DRAW on the next adjacent four tracks 328–334. The direction of the optical tape is the same or is reversed if desired.

The optical tape drive 124 using the head configuration 300 with eight independently positionable head systems is capable of significant failure recovery. The local channel controller detects failure of any one or more head units of that head system and reports the failure to the central controller 206. The central controller 206 also detects failure of an entire head system. Since each head (head unit or head system or both) is independent, the remaining operating heads may be used by the central controller 206 in the event of failure of any one or more of the heads. For example, if any one head fails, the optical tape drive 124 may still read or write any seven (7) tracks; if any two heads fail, the optical tape drive 124 may still read or write any six (6) tracks, etc. For four tracks, read and unverified write operations may proceed at full data throughput in the event of failure of up to any four heads. For example, in FIG. 3B, if any one up to four of the head units 302–308 or the corresponding head systems fail, then the head units 310–316 are used for read or unverified write operations. For four tracks, DRAW operations may resume at approximately ⅓ the normal throughput rate in the event of failure of any one to four head units systems, where data is written in one pass, the optical tape is rewound, and the data is read in a second pass for verification.

If operation is allowed on less than four tracks for DRAW operations, then failure recovery enables even higher throughput. For example, any one or two of the head units 302–316 or the corresponding head systems may fail, and DRAW operations may continue with respect to three tracks at a time for three-fourths (3/4) normal data throughput. Three to four heads may fail, and DRAW operations may proceed using four heads on two tracks for one-half (½) throughput. Even in the event of failure of up to six heads, DRAW operations may resume with two tracks for one-fourth (¼) throughput.

It is noted, however, that the central controller 206 and the memory 208 of the optical tape drive 124 may be configured for four channels at a time and may not be programmed to handle one, two or three track operation. In that case, DRAW operations may proceed with up to four head failures at approximately ⅓ throughput rate. In any event, significant failure recovery occurs in the event of failure of one or more of the heads.

A four independent head system is easily configured by excluding four of the head units shown in FIGS. 3A–3C. For example, a four head system may include head units 302–308. Up to four tracks may be written or read at a time. DRAW operations are performed with two tracks at a time, such as, for example, the tracks 320 and 322 using the head units 302–308 shown in FIG. 3C.

Figure 4A:
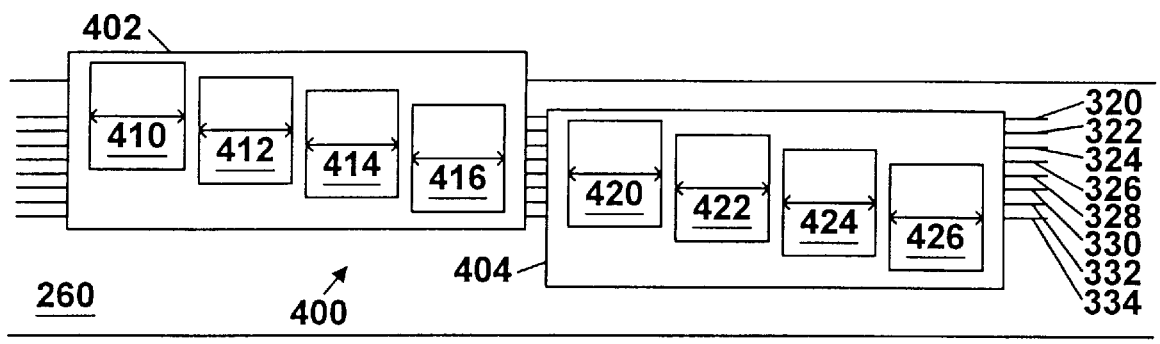
FIG. 4A is a perspective diagram of an alternative embodiment of the present invention illustrating a head array configuration with four head units per head system.

Referring now to FIG. 4A, an alternative embodiment of the present invention is shown illustrating a head array configuration 400. The head array configuration 400 also includes eight heads but only two head systems, where each head system includes an array of four head units. In particular, two head systems 402 and 404 are shown, each configured in a similar manner as the head systems 212 or 230. However, the head system 402 includes four head units 410, 412, 414 and 416 while the head system 404 includes another four head units 420, 422, 424 and 426. The head units 410–416 are in a fixed position relative to each other and to the head system 402, so that all of the head units 410–416 are moved in unison. The head units 410–416 are fixedly aligned with four separate tracks. The spacing between each of the head units 410–416 is preferably the same and may correspond to any number of tracks on an optical tape as desired. As shown in FIG. 4A, for example, the head units 410–416 are spaced apart by one track each, and the head system 402 is positioned to align the head units 410–416 with the tracks 320–326, respectively, of the optical tape 260. The head units 420–426 are positioned and configured in a similar manner, where the head system 404 is positioned to align the head units 420-426 with the next four adjacent tracks 328–334 of the optical tape 260. In this manner, up to eight tracks of data on the optical tape 260 may be read or written at a time in a single pass.

Figure 4B:
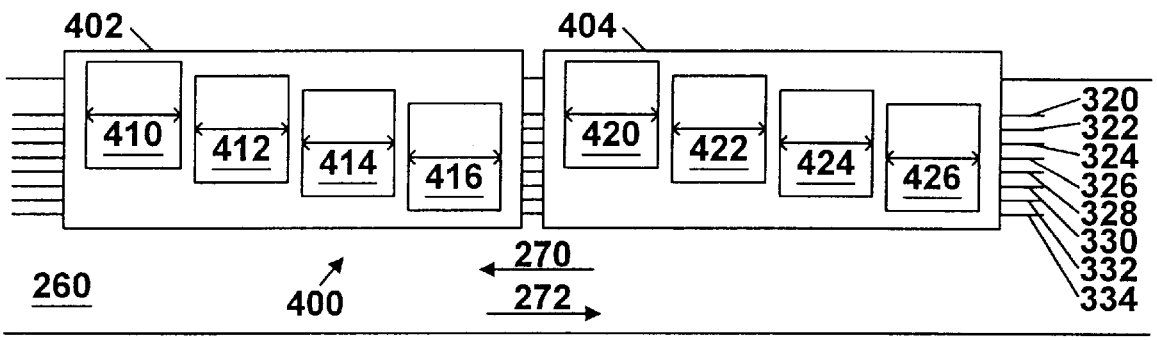
FIG. 4B is a perspective diagram of the head configuration of FIG. 4A positioned to perform direct read after write operations.

FIG. 4B illustrates the head array configuration 400 positioned for purposes of a DRAW operation, where the head systems 402 and 404 are aligned with the same tracks of an optical tape. In particular, as shown in FIG. 4B, the head system 402 is positioned to align the head units 410–416 with the tracks 320–326, respectively, while the head system 404 is also positioned to align the head units 420–426 with the tracks 320–326 of the optical tape 260. In a similar manner as described above for FIG. 3B, the head units 420–426 of the head system 404 are operated to write data when the optical tape is moved in the direction of the arrow 272 while the head units 410–416 of the head system 402 are operated to read data. Thus, data may be written and verified on the data tracks 320–326 in a single pass of the optical tape 260. In a similar manner, the head units 410–416 are operated to write data while the head units 420–426 are operated to read data when the optical tape 260 is moved in the direction of the arrow 272 to write and verify data in the opposite direction.

The use of a head array, or multiple head units per head system, reduces the cost and the complexity of the control electronics of the optical tape drive 124. For example, only one course servo and only one fine servo is necessary for positioning and aligning each head system. It is noted, however, that each of the head units in each head system is preferably operated to perform the same read or write operation to significantly reduce potential crosstalk problems. Thus, for example, all of the head units 410–416 of the head system 402 either perform the same read or write operation, where read and write operations are not mixed within a single head unit.

The head array configuration 400 also allows failure recovery in the event of failure of one or more head units 410–426 or failure of either head system 402 or 404. Such failure recovery is less flexible, however, than the head configuration 300 using eight (or any corresponding number of) independent heads. Read or unverified write operations with four tracks may proceed at full speed in the event of failure of any one head unit 410–426 or failure of either head system 402 or 404. Four track DRAW operations may proceed at approximately ⅓ data throughput in the event of failure of any one head unit 410–426 or failure of either head system 402 or 404. Read and write operations are also achieved if one head unit fails on both of the head systems 402 and 404 as long as the head units do not correspond to the same track. For example, read and unverified write operations are achieved a full four-track speed in the event of failure of head units 410 and 422, 412 and 420, etc. Also, four-track DRAW operations are possible at approximately ⅓ data throughput.

Figure 5A:
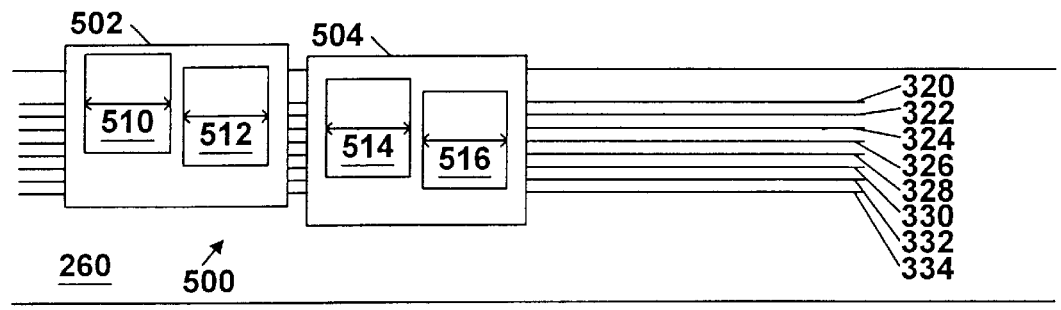
FIG. 5A is a perspective diagram of an alternative embodiment of the present invention illustrating a head array configuration with two head units per head system.
Figure 5B:
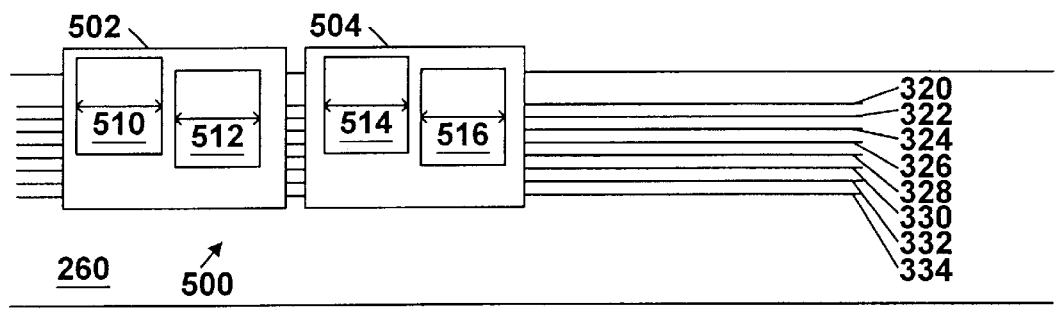
FIG. 5B is a perspective diagram of the head configuration of FIG. 5A positioned to perform direct read after write operations.
Figure 5C:
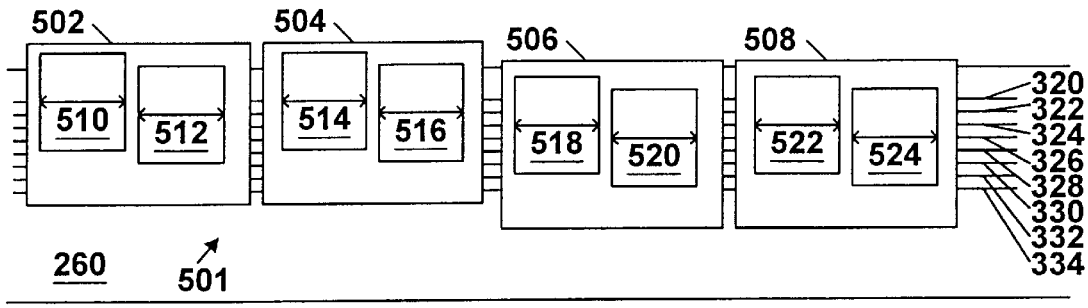
FIG. 5C is a perspective diagram similar to FIG. 5A illustrating that additional head arrays may be included as desired.

Many different head configurations are possible according to the present invention. In FIG. 5A, for example, a four head array configuration 500 is shown including two head systems 502, 504, each including two head unit arrays. In particular, the head system 502 includes two head units 510 and 512 and the head system 504 includes two head units 514 and 516. The head array configuration 500 enables four tracks to be read or written at a time in a single pass, although writes would not be verified. The head array configuration 500 enables two tracks to be read or written for DRAW operations in a similar manner as described previously as shown in FIG. 5B. Also, additional dual-head unit head systems may be added to increase the throughput as desired. For example, FIG. 5C illustrates an eight head array configuration 501 using two additional head systems 506 and 508, where head system 504 includes head units 518 and 520 and head system 508 includes head units 522 and 524.

In a similar manner as described previously, the head array configuration 500 allows failure recovery of the optical tape drive 124 in the event of failure of any one head unit or Failure of either head system 502 or 504. Read and unverified writes are continued at full throughput rate and DRAW operations are continued at approximately ⅓ data throughput using the fully functional head system. Also, read and unverified writes are continued at full throughput rate and DRAW operations are continued at approximately ⅓ data throughput in the event of failure of opposite head units on each head system 502 and 504, such as failure of head units 510 and 516 or failure of head units 512 and 514. The local controllers 216 and 234 and the central controller 206 control data flow accordingly. A similar analysis applies to the eight head array configuration 501.

Another benefit of redundant optical heads is the ability to generate and write redundant information to an optical tape, where the redundant information facilitates failure recovery during either read or write operations. Redundant data may be generated in any one of several manners using any one of several known techniques. In one embodiment, parity or mirrored data is generated using redundant techniques in an analogous manner as in RAID configurations of magnetic disk drives, where optical tape tracks roughly correspond to the disk drives in a disk array. For example, corresponding bits or bytes of data to be written on multiple tracks on an optical tape may be Exclusive-OR'd (XOR) together to generate corresponding parity bits or bytes. At lease one track on the optical tape is used as a parity track for storing the parity data, where the parity data is generally aligned with its corresponding data on parallel tracks. In the event any data from any one track is lost or irretrievable, the data from the remaining tracks may be used to regenerate or reconstruct the lost data. XOR operations are performed on the retrieved data to generate the lost data. Alternatively, the data is copied and mirrored to a mirrored track, where a mirrored track is provided for each data track.

In FIG. 3A, for example, data is written on the optical tape 260 with seven of the eight head units 302–314 on a corresponding seven of the eight tracks 320–332, while corresponding parity data is written on the eighth track 334 by the head unit 316. If any one of the head units 302–316 fails, an alert signal is sent to a host system, such as the computer system 100, where the alert indicates a partial failure. Although the host system may terminate write operations, the write operations may instead be continued since the data associated with the failed head may be reconstructed using corresponding data from the remaining tracks. The same is true during a read operation of redundant data. If any one of the head units 302–316 fails while reading redundant data, the read operation continues to retrieve the remaining data. The lost or irretrievable data is then regenerated or reconstructed using XOR operations with the retrieved data. Alternatively, every other head unit 304, 308, 312 and 316 could be used to write mirrored information on tracks 322, 326, 330 and 334 for the respective data tracks 320, 324, 328 and 332. Redundant techniques may be used in conjunction with any of the configurations previously discussed. For configurations with only two heads, mirrored data is most feasible, although it would be possible to generate and store parity information on a separate pass of the heads.

The redundant information (parity or mirrored) is generated and used at any level desired. In one embodiment, a tape drive utility program loaded in the main memory 110 and executed by the CPUJ 104 generates and interprets the redundant information. In the event of failure of a head unit, the utility program notes the location of lost data. When the data is later retrieved., the utility program uses data from the remaining tracks to regenerate the data on the track with the failed head unit, or, in the case of mirrored data, to replace the data from that track. In an alternative embodiment, the tape drive 124 itself may be configured for redundant operation. The central controller 206 includes parity logic (not shown) to generate redundant data and to write the parity or mirrored information on a parity or mirror track of the optical tape. In the event of failure of any one of the head units during a read operation, the central controller 206 reconstructs the lost data or retrieves the mirrored data before sending the data to the SCSI bus 121.

It is now appreciated that an optical tape drive according to the present invention provides many advantages over other mass storage systems, such as magnetic tape drive systems. An optical head is capable of both reading and writing data, so that DRAW functions are easily performed with two heads per track. Optical systems enable greater storage capacity for a given size of tape, so that a greater amount of storage space is available. The length of tape for a given storage capacity is reduced, which results in a concomitant reduction in access time, so that data may be retrieved in a shorter amount of time. Also, optical heads do not need to physically contact the tape media, so that wear and tear of the optical media and heads is substantially reduced as compared to magnetic tape systems. An optical tape drive according to the present invention provides all these advantages among others in a cost effective manner.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. An optical tape drive that includes redundant optical heads to continue reading data from and writing data to an optical tape in the event of failure of an optical head, comprising:

a plurality of optical heads, each capable of reading data from and writing data to the optical tape;

detection logic coupled to detect failure of any of said plurality of optical heads; and control apparatus coupled to said plurality of optical heads and to said detection logic that positions said plurality of optical heads along the width of the optical tape, that controls each of said plurality of optical heads to read and write data, that receives and moves the optical tape, and that detects failure of any of said plurality of optical heads and performs failure recovery by continuing read and write operations with remaining ones of said plurality of optical heads.

2. The optical tape drive of claim 1, further comprising:

said control apparatus performing read and unverified write operations at a predetermined data throughput rate prior to failure; and said control apparatus continuing to perform read and unverified write operations after failure of any of said plurality of optical heads at less than said predetermined data throughput rate.

3. The optical tape drive of claim 2, further comprising:

said control apparatus continuing to perform read and unverified write operations after failure of any of said plurality of optical heads using half of said plurality of optical heads to achieve approximately half of said predetermined data throughput rate.

4. The optical tape drive of claim 1, further comprising:

said control apparatus aligning pairs of said plurality of optical heads with corresponding tracks of the optical tape to perform read and unverified write operations at a predetermined data throughput rate prior to failure; and said control apparatus continuing to perform read and unverified write operations after failure of any of said plurality of optical heads at said predetermined data throughput rate using half of said plurality of optical heads.

5. The optical tape drive of claim 1, further comprising:

said control apparatus continuing to perform verified write operations after failure of any of said plurality of optical heads by writing data in a first pass, rewinding the optical tape, and reading the written data in a second pass.

6. The optical tape drive of claim 1, further comprising:

said control apparatus performing direct read after write during normal operation prior to failure of an optical head; and said control apparatus continuing to perform direct read after write operations at a reduced data throughput after failure of any of said plurality of optical heads.

7. The optical tape drive of claim 6, further comprising:

said control apparatus performing direct read after write operations during normal operation with a predetermined number of tracks of the optical tape; and said control apparatus continuing to perform direct read after write operations after failure of any of said plurality of optical heads using less than said predetermined number of tracks.

8. The optical tape drive of claim 1, further comprising:

said plurality of optical heads including two independently positionable optical heads.

9. The optical tape drive of claim 1, further comprising:

said plurality of optical heads including four independently positionable optical heads.

10. The optical tape drive of claim 1, further comprising:

said plurality of optical heads including two independently positionable head systems, wherein each of said head systems includes two optical heads.

11. The optical tape drive of claim 1, further comprising:

said plurality of optical heads including eight independently positionable optical heads.

12. The optical tape drive of claim 1, further comprising:

said plurality of optical heads including two independently positionable head systems, wherein each of said head systems includes an array of four optical heads.

13. The optical tape drive of claim 1, further comprising:

said plurality of optical heads including four independently positionable head systems, wherein each of said head systems includes two optical heads.

14. The optical tape drive of claim 1, wherein said control apparatus further comprises:

a plurality of head systems, each including:
at least one of said plurality of optical heads;
head control circuitry coupled to each of said at least one of said plurality of optical heads;
course and fine tracking servo apparatus;
a local servo controller coupled to said course and fine tracking servo apparatus and to said head control circuitry;
data processing circuitry coupled to said course and fine tracking servo apparatus and to said head control circuitry; and
a channel controller coupled to said local servo controller and to said data processing circuitry that includes failure detection circuitry;

a central servo controller coupled to each of said plurality of head systems; and a central controller coupled to said central servo controller and to each of said plurality of head systems that controls tracking and data flow of each of said plurality of optical heads, wherein said central controller includes central failure detection circuitry.

15. The optical tape drive of claim 1, wherein said control apparatus further comprises:

control logic that generates parity data to be written to the optical tape and that reconstructs data corresponding to a failed optical head using redundant information read from remaining ones of said plurality of optical heads.

16. A computer system, comprising:

a processor;

main memory coupled to said processor;

a peripheral bus coupled to said processor; and an optical tape drive coupled to said peripheral bus, comprising:
  an optical tape receiving and driving mechanism that receives and manipulates an optical tape;
  a plurality of optical heads, each capable of reading data from and writing data to said optical tape;
  detection logic coupled to detect failure of any of said plurality of optical heads; and
  control apparatus coupled to said plurality of optical heads and to said detection logic that positions said plurality of optical heads along the width of said optical tape, that controls each of said plurality of optical heads to read and write data, that receives and moves said optical tape, and that detects failure of any of said plurality of optical heads and continues read and write operations.

17. The computer system of claim 16, further comprising:

said processor executing a driver and software code loaded within said main memory that controls operations of said optical tape drive.

18. The computer system of claim 16, further comprising:

a drive controller coupled to said peripheral bus, wherein said optical tape drive is coupled to said peripheral bus via said drive controller.

19. The computer system of claim 18, further comprising:

said peripheral bus implemented according to the peripheral component interconnect bus; and said drive controller comprising a peripheral component interconnect to small computer system interface compatible drive controller.

20. The computer system of claim 16, further comprising:

said processor generating parity data to be written to said optical tape and that reconstructs data corresponding to a failed optical head using redundant information read from remaining ones of said plurality of optical heads.

21. A method of providing and operating an optical tape drive to continue reading and writing data in the event of failure of an optical head, comprising:

providing a plurality of read/write optical heads including at least two independently positionable optical heads;

detecting failure of any of the optical heads; and continuing to read and write data using remaining and functional optical heads in the event of failure of any of the optical heads.

22. The method of claim 21, further comprising:

selecting and using half of the optical heads in the event of failure of any one to up to half of the optical heads.

23. The method of claim 22, further comprising:

using half of the optical heads to write data on selected tracks in a first pass of the optical tape;

rewinding the optical tape; and reading the data from the selected tracks in a second pass of the optical tape.

24. The method of claim 21 further comprising:

during normal operation prior to failure of any of the optical heads, performing direct read and write operations on a selected number of tracks of optical tape; and after failure of any of the optical heads, performing direct read and write operations on less than the selected number of tracks of optical tape.

\* \* \* \* \*